US012680592B2

(12) United States Patent (10) Patent No.: US 12,680,592 B2
Nygren et al. (45) Date of Patent: Jul. 14, 2026

(54) DAMPER

(71) Applicant: Öhlins Group AB, Upplands Väsby (SE)

(72) Inventors: Nils Göran Nygren, Huddinge (SE); Magnus Danek, Sollentuna (SE)

(73) Assignee: ÖHLINS GROUP AB, Upplands Väsby (SE)

( * ) Notice: Subject to any disclaimer, the term of this patent is extended or adjusted under 35 U.S.C. 154(b) by 321 days.

(21) Appl. No.: 18/226,312

(22) Filed: Jul. 26, 2023

(65) Prior Publication Data

US 2024/0035539 A1 Feb. 1, 2024

(30) Foreign Application Priority Data

Jul. 28, 2022 (EP) ..................................... 22187572

(51) Int. Cl.
F16F 9/18 (2006.01)
F16F 9/06 (2006.01)
(Continued)

(52) U.S. Cl.
CPC .............. F16F 9/185 (2013.01); F16F 9/062 (2013.01); F16F 9/065 (2013.01); F16F 9/3242 (2013.01);
(Continued)

(58) Field of Classification Search
CPC .. F16F 9/185; F16F 2228/066; F16F 2222/12; F16F 2232/08; F16F 9/062;
(Continued)

(56) References Cited

U.S. PATENT DOCUMENTS 1,902,018 A * 3/1933 Davis .................... D06F 71/067
38/40
2,379,750 A 7/1945 Rossman
(Continued)

FOREIGN PATENT DOCUMENTS

CN 113958639 A 1/2022
DE 1028438 B 4/1958
(Continued)

OTHER PUBLICATIONS

European Search report regarding European Patent Application No. 22187572.7, dated Feb. 7, 2023.
(Continued)

*Primary Examiner* — Henry Y Liu
(74) *Attorney, Agent, or Firm* — Kagan Binder, PLLC

(57) ABSTRACT
A damper filled with a damping medium in use comprising an inner tube; a movable assembly comprising a piston assembly and a piston rod attached to said piston assembly, said movable assembly being slidably disposed within the inner tube, the movable assembly defining a first working chamber and a second working chamber within the inner tube, the piston rod being disposed in the second working chamber; an end member disposed at an end of the inner tube, the end member having an inner surface facing towards the first working chamber; an actuated valve assembly being provided in the end member, said valve assembly being configured to control a damping medium flow entering or exiting the first working chamber, wherein the movable assembly comprises a stem assembly, said stem assembly being slidably connected to and partially embedded in said movable assembly.

20 Claims, 7 Drawing Sheets

(51) Int. Cl.
   *F16F 9/32*           (2006.01)
   *F16F 9/48*           (2006.01)
   *F16F 9/49*           (2006.01)
(52) U.S. Cl.
   CPC ............... *F16F 9/486* (2013.01); *F16F 9/49*
      (2013.01); *F16F 2222/12* (2013.01); *F16F*
      *2228/066* (2013.01); *F16F 2232/08* (2013.01)
(58) Field of Classification Search
   CPC .......... F16F 9/065; F16F 9/3242; F16F 9/486;
      F16F 9/49; F16F 9/48; F16F 9/466; F16F
      9/3207; F16F 9/50; F16F 9/516
   See application file for complete search history.

(56)                 References Cited

U.S. PATENT DOCUMENTS

| | | | | |
|---|---|---|---|---|
| 2,553,810 | A * | 5/1951 | Carlson | F15B 15/222 188/297 |
| 2,559,633 | A * | 7/1951 | Katz | F16F 9/486 188/289 |
| 2,619,199 | A * | 11/1952 | Schwary | F16F 9/49 188/315 |
| 2,729,308 | A * | 1/1956 | Koski | F16F 9/48 188/320 |
| 2,742,112 | A * | 4/1956 | Wessel | F16F 9/49 188/315 |
| 3,998,132 | A * | 12/1976 | Rasigade | F15B 15/225 91/401 |
| 4,076,276 | A * | 2/1978 | Wijnhoven | F16F 9/348 188/315 |
| 4,706,781 | A * | 11/1987 | Ikimi | B66F 9/08 91/405 |
| 4,768,629 | A * | 9/1988 | Wossner | F16F 9/49 188/322.22 |
| 4,782,925 | A * | 11/1988 | Grundei | F16F 9/585 188/315 |
| 4,850,461 | A * | 7/1989 | Rubel | F16F 9/466 188/282.1 |
| 5,129,311 | A * | 7/1992 | Hart | F15B 15/1447 91/401 |
| 5,413,030 | A * | 5/1995 | Richardson | F15B 15/227 92/85 B |
| 5,680,913 | A * | 10/1997 | Wood | F15B 15/222 188/289 |
| 6,340,081 | B1 * | 1/2002 | Keil | F16F 9/348 188/322.22 |
| 8,066,105 | B2 * | 11/2011 | Maniowski | F16F 9/512 188/282.1 |
| 8,807,299 | B2 * | 8/2014 | Gagnon | F16F 9/48 267/226 |
| 8,991,571 | B2 * | 3/2015 | Murakami | F16F 9/486 188/289 |
| 9,033,121 | B2 * | 5/2015 | Kazmirski | F16F 9/512 188/280 |
| 9,285,011 | B2 * | 3/2016 | Kazmirski | F16F 9/34 |
| 9,546,707 | B2 * | 1/2017 | Kus | F16F 9/48 |
| 9,605,726 | B2 * | 3/2017 | Baldoni | F16F 9/49 |
| 9,662,952 | B2 * | 5/2017 | Funke | F16F 9/062 |
| 10,167,921 | B2 * | 1/2019 | Flacht | F16F 9/585 |
| 10,195,918 | B2 * | 2/2019 | Watanabe | F16F 9/585 |
| 10,202,988 | B2 * | 2/2019 | Stander | F15B 15/222 |
| 10,214,280 | B2 * | 2/2019 | Kondo | F15B 15/227 |
| 10,683,906 | B2 * | 6/2020 | Kus | F16F 9/49 |
| 10,752,076 | B2 * | 8/2020 | Knapczyk | F16F 9/48 |
| 10,919,597 | B2 * | 2/2021 | Murakami | B60G 17/015 |
| 10,962,081 | B2 * | 3/2021 | Sankaran | B60G 13/08 |
| 11,306,798 | B2 * | 4/2022 | Cox | F16F 9/49 |
| 11,519,476 | B2 * | 12/2022 | Gross | F16F 9/49 |
| 11,592,075 | B2 * | 2/2023 | Lun | F16F 9/537 |
| 12,416,344 | B2 * | 9/2025 | Sarapata | F16F 9/49 |
| 12,422,017 | B2 * | 9/2025 | Kasprzyk | F16F 9/486 |
| 2008/0006494 | A1 * | 1/2008 | Vandewal | B60G 17/0416 188/313 |
| 2008/0006495 | A1 * | 1/2008 | Vandewal | B60G 17/08 188/314 |
| 2010/0078275 | A1 * | 4/2010 | Kazmirski | F16F 9/512 188/280 |
| 2014/0318908 | A1 * | 10/2014 | Kazmirski | F16F 9/512 188/280 |
| 2016/0059656 | A1 * | 3/2016 | Funke | B60G 13/08 188/267.1 |
| 2017/0074342 | A1 * | 3/2017 | Weber | B60G 17/0528 |
| 2019/0203798 | A1 * | 7/2019 | Cox | F16F 9/18 |
| 2019/0375263 | A1 * | 12/2019 | Knapczyk | B60G 17/08 |
| 2020/0216139 | A1 * | 7/2020 | Murakami | F16F 9/46 |
| 2021/0018061 | A1 * | 1/2021 | Lun | F16F 9/43 |
| 2021/0054901 | A1 * | 2/2021 | Gross | F16F 9/18 |
| 2022/0389983 | A1 * | 12/2022 | Cox | B60G 13/08 |
| 2023/0019929 | A1 * | 1/2023 | Cox | F16F 9/18 |
| 2023/0111905 | A1 * | 4/2023 | Sarapata | F16F 13/007 267/226 |
| 2023/0117340 | A1 * | 4/2023 | Kasprzyk | F16F 9/585 188/284 |
| 2025/0154999 | A1 * | 5/2025 | Schluge | F16F 13/007 |

FOREIGN PATENT DOCUMENTS

| | | | |
|---|---|---|---|
| FR | 3013413 | A1 | 5/2015 |
| JP | S5012484 | A | 2/1975 |
| JP | H04114143 | U | 10/1992 |

OTHER PUBLICATIONS

Chinese Office Action for co-pending Cn 113958639A, 7 pp., Apr. 2, 2026.

* cited by examiner

DAMPER

CROSS-REFERENCE TO RELATED APPLICATIONS

This application claims the benefit of European Application No. 221875727, filed on Jul. 28, 2022. The entire disclosure of the application referenced above is incorporated herein by reference.

TECHNICAL FIELD

The present disclosure relates to a damper, such as a shock absorber.

BACKGROUND

Dampers, such as shock absorbers, are used in many applications requiring the absorption of shocks or damping in general. A damper comprises a tube, such as a cylinder, in which a movable assembly is provided. The movable assembly divides the tube in two damping chambers, often referred to as the compression chamber and the rebound chamber.

In order to improve the damping performance, an additional damping element such as a bump rubber is arranged in an abutting portion of the cylinder, allowing to prevent hard bottoming. Alternatively, it has been proposed to provide a valve in an end member. When the piston nears the end stroke, it pushes a movable element of the valve that restricts flow, causing further damping of the piston stroke. In this valve, orifices are restricted by a movable element that is preloaded by a spring. This movable element is pushed by the piston via a supplementary spring interposed between the piston and the movable element. The supplementary spring is connected either to the piston, thereby moving in unison with the piston, or to the movable element, thereby moving in unison with the movable member, as illustrated in DE3510866, U.S. Pat. Nos. 4,768,629, 4,782, 925 or U.S. Pat. No. 5,333,708.

A limitation of the above-mentioned solution is the lack of control of the damping effect when the piston nears the end stroke.

SUMMARY

It is an object of the present disclosure to overcome one or more of the above drawbacks. It is an aim of the disclosure to provide a damper with an improved soft bottoming.

For the above purpose, the disclosure is directed to a damper filled with a damping medium in use comprising: an inner tube; an end member disposed at an end of the inner tube, the end member having an inner surface facing towards a first working chamber; a movable assembly comprising a piston assembly and a piston rod attached to said piston assembly, said movable assembly being slidably disposed within the inner tube, the movable assembly defining the first working chamber and a second working chamber within the inner tube, the piston rod being disposed in the second working chamber, said movable assembly having a surface facing towards the first working chamber; an actuated valve assembly being provided in the end member, said valve assembly being configured to control a damping medium flow entering or exiting the first working chamber; characterized in that the movable assembly comprises: a stem assembly resiliently connected to the piston assembly and/or the piston rod via a biasing means, and an elongated cavity opening in the surface facing towards the first working chamber and extending in a direction opposed to the end member; in that the stem assembly and the elongated cavity are adapted so that the stem assembly is guided in translation within the cavity; and in that the damper is configured so that the stem assembly actuates the actuated valve assembly, thereby causing a reduction in the damping medium flow exiting the first working chamber via the actuated valve assembly, while the movable assembly nears the end member.

According to specific embodiments of the disclosure, the damper comprises one or more of the following technical features:

a downstream side wherein the elongated cavity is formed in the piston rod;

the actuated valve assembly comprises a flow control member slidingly mounted in said assembly, said actuated valve assembly being configured to be actuated when a proximal end portion of the stem assembly presses the flow control member;

the stem assembly and the elongated cavity are configured so that a portion of the stem assembly, in particular said portion extending from a proximal end of the stem assembly or from a proximal end of the proximal end portion of the stem assembly in the direction opposed to the end member (e.g. distal direction), protrudes towards the end member from the surface of the movable assembly facing towards the first working chamber, when the stem assembly does not press the flow control member and/or when the proximal end of the stem assembly or the proximal end portion of the stem assembly does not contact the flow control member;

a spring is interposed between the flow control member and the end member; urging the flow control member away from said end member;

the flow control member is configured to reciprocate so as to allow the opening and closing of a control flow passage that is fluidly connected to the first working chamber;

wherein the flow control member comprises or consists in a cup, the interior side of which faces the inner surface of the end member;

an outer tube is arranged around the inner tube, the outer tube defining an outer chamber between the inner tube and the outer tube, the outer chamber being in fluid communication with the second working chamber;

the control flow passage is fluidly connected to the outer chamber;

the stem assembly comprises an actuating member for actuating the actuated valve assembly, such as a puck, said member forming the proximal end portion of the stem assembly, preferably said member being fixed in rotation to a stem element of said stem assembly, said stem element axially extending from the elongated cavity to the actuating member;

wherein the actuating member is connected to a proximal end of the stem element by means of a spherical connection;

a distal portion of the stem element is connected to the biasing means, said means comprising at least one spring;

the at least one spring comprises a first spring that is connected at an end thereof to a distal end of the stem element adapted to reciprocate within the piston rod and at another end thereof to a distal or a proximal portion of the piston rod;

the at least one spring is arranged in the elongated cavity;

the at least one spring comprises a second spring, wherein the first and second springs are in stack arrangement and the distal end of the stem element is sandwiched between said springs;

two valve assemblies, namely a first and a second valve assembly disposed, respectively, in a first and a second valve assembly chamber, the two valve assemblies each comprising a bleed valve, namely a first and a second bleed valve with an upstream side in fluid communication with the first working chamber and the outer chamber, respectively;

two check valves, namely a first and a second check valve, the first check valve being configured to allow flow from the first chamber to the second chamber via the first bleed valve, the second check valve being configured to allow flow from the second chamber to the first chamber via the second bleed valve;

a pressurization reservoir divided by a separating member to define a third chamber filled with the damping medium, in use, and pressurized by a force acting on the separating member, the third chamber being in fluid communication with a downstream side of the first bleed valve and a downstream side of the second bleed valve;

the end member is provided with a first pressure regulation valve for regulating flow between the first chamber and the second chamber, the first pressure regulation valve having an upstream side in fluid communication with the first working chamber via the actuated valve assembly;

the end member comprises at least one through-passage extending between the end member inner surface and an end member outer surface, the first pressure regulation valve being mounted on the end member outer surface, preferably the at least one through-passage being in fluid communication with the control flow passage.

the first pressure regulation valve comprises a one-way valve;

the first pressure regulation valve comprises one or more shims positioned downstream from the at least one through-passage;

the first and the second check valve being in fluid communication with the first and the second bleed valve, respectively; an upstream side of the first and the second check valve are in fluid communication with the downstream side of the first and the second bleed valve, respectively; a downstream side of the first and the second check valve are in fluid communication with the outer chamber and the first working chamber, respectively; and the third chamber is in fluid communication with the upstream side of the first check valve and the upstream side of the second check valve;

the end member comprises at least one further passage with an upstream end opening in the at least one through-passage and a downstream end in fluid communication with the upstream side of the first bleed valve;

each valve assembly comprises a tube having one or more openings and a needle slidably disposed inside the tube for controlling a damping medium flow entering inwardly through the one or more openings, in operation;

the needle is actuated by a solenoid, a stepper motor or biased by an adjustable spring;

the second valve assembly comprises the first check valve;

the first check valve comprises at least one shim disposed about the tube of the second valve assembly and being biased against a first valve seat, an outside diameter of the first valve seat coinciding with an inside diameter of the second valve assembly chamber, the first valve seat comprising openings facing the at least one shim of the first check valve;

the at least one shim of the first check valve, in particular one shim, being slidingly disposed about the tube and biased by a first helical spring, an end of the first helical spring resting against the at least one shim of the first check valve and an opposite end of the first helical spring being arranged in a first spring receiver disposed about the tube of the second valve assembly;

the one or more shims of the first check valve are sandwiched between the first valve seat and a flange formed on the tube of the second valve assembly;

the end member comprises the second check valve;

the second check valve comprises one or more shims mounted on the end member inner surface and positioned downstream from at least one additional passage formed in the end member, the at least one additional passage being in fluid communication with the downstream side of the second bleed valve;

the movable assembly comprises a second pressure regulation valve with an upstream side in fluid communication with the second working chamber and a downstream side in fluid communication with the first working chamber;

the first valve assembly comprises a third pressure regulation valve with an upstream side in fluid communication with the first chamber and a downstream side in fluid communication with the third chamber;

the third pressure regulation valve is arranged upstream of the first bleed valve, the third pressure regulation valve comprising one or more shims disposed about the tube of the first valve assembly, the one or more shims being sandwiched between a fourth valve seat disposed about the tube of the first valve assembly and a flange formed on the tube of the first valve assembly;

a cylinder head arranged at an end of the outer tube, the cylinder head being adjacent to the end of the inner tube and connected to the end member;

the first valve assembly chamber, the second valve assembly chamber and the third chamber are formed in the cylinder head;

the movable assembly comprises a fourth pressure regulation valve with an upstream side in fluid communication with the first chamber and a downstream side in fluid communication with the second working chamber;

the movable assembly comprises a piston rod disposed in the second working chamber;

a rebound check valve being configured to allow flow from the second chamber to the first chamber via the outer chamber;

the end member comprises the rebound check valve;

the rebound check valve comprises one or more shims mounted on the end member inner surface and positioned downstream from at least one additional passage formed in the end member, the at least one additional passage being in fluid communication with the downstream side of the outer chamber.

Advantageously, the measures according to the disclosure allow low manufacturing and assembling costs of the progressive damping components.

BRIEF DESCRIPTION OF DRAWINGS

Aspects of the disclosure will now be described in more detail with reference to the appended drawings, wherein same reference numerals illustrate same features.

DETAILED DESCRIPTION

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided for thoroughness and completeness.

The dampers of the present disclosure are filled with a damping medium. Preferably, the damping medium is a liquid damping medium, for example oil. Other damping media known in the field of dampers can be used as well.

Figure 1:
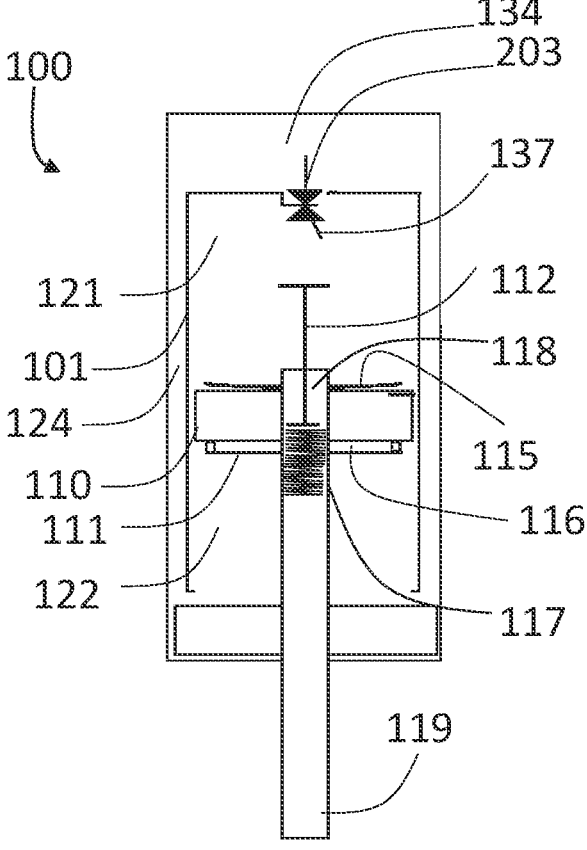
FIG. 1 represents a damper according to a first embodiment.

FIG. 1 discloses a schematic view of a damper according to a first embodiment of the disclosure. The damper 100 filled with a damping medium in use comprises an inner tube 101, a movable assembly 110 comprising a piston assembly 111 to which a piston rod 119 is attached. The movable assembly 110 is slidably disposed within the inner tube 101, wherein the movable assembly 110 defines a first working chamber 121 and a second working chamber 122 within the inner tube 101. The piston rod 119 is provided in the second working chamber 122. The first working chamber 121 is closed by an end member 134, wherein the end member 134 has an inner surface facing towards the first working chamber 121. An actuated valve assembly 137 is provided in the end member 134. The actuated valve assembly 137 is configured to control a damping medium flow exiting the first working chamber 121 to another chamber such as an outer chamber 124 defined by an outer tube 103 arranged around the inner tube 101. The outer chamber 124 is in fluid communication with the second working chamber 122. The movable assembly 110 comprises a stem assembly 112. The stem assembly 112 is slidably connected to and partially embedded in said movable assembly 110, in particular in an elongated cavity 118, in particular an axial bore, formed in the piston rod 119 as shown in FIG. 1. The damper 100 is configured so that the stem assembly 112 actuates the actuated valve assembly 137 when the movable assembly 110 nears the end member 134 so as to reduce a damping medium flow exiting the first working chamber 121, thereby increasing the compression resistance during an end stroke. In FIG. 1, the stem assembly 112 is biased by a spring element 117 (e.g. helical spring). The positioning of the spring (element) 117 should not be regarded as limiting as other possibilities can be envisaged as presented below. In FIG. 1, the stem assembly 112 is partially embedded in the piston rod 119, in particular in a cavity formed in the piston rod 119, when the stem assembly 112 is not biased, in particular compressed.

Figure 2:
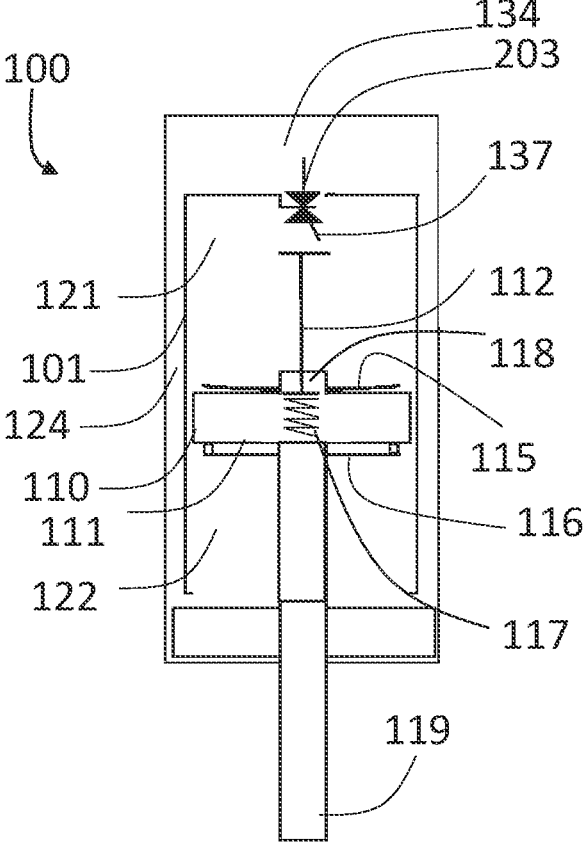
FIG. 2 illustrates a damper according to a second embodiment.

In a second embodiment, as shown in FIG. 2, the stem assembly 112 is embedded in the piston assembly 111, in particular in a cavity formed in the piston assembly 111, instead of being imbedded in the piston rod 119 as shown in FIG. 1.

Figure 3:
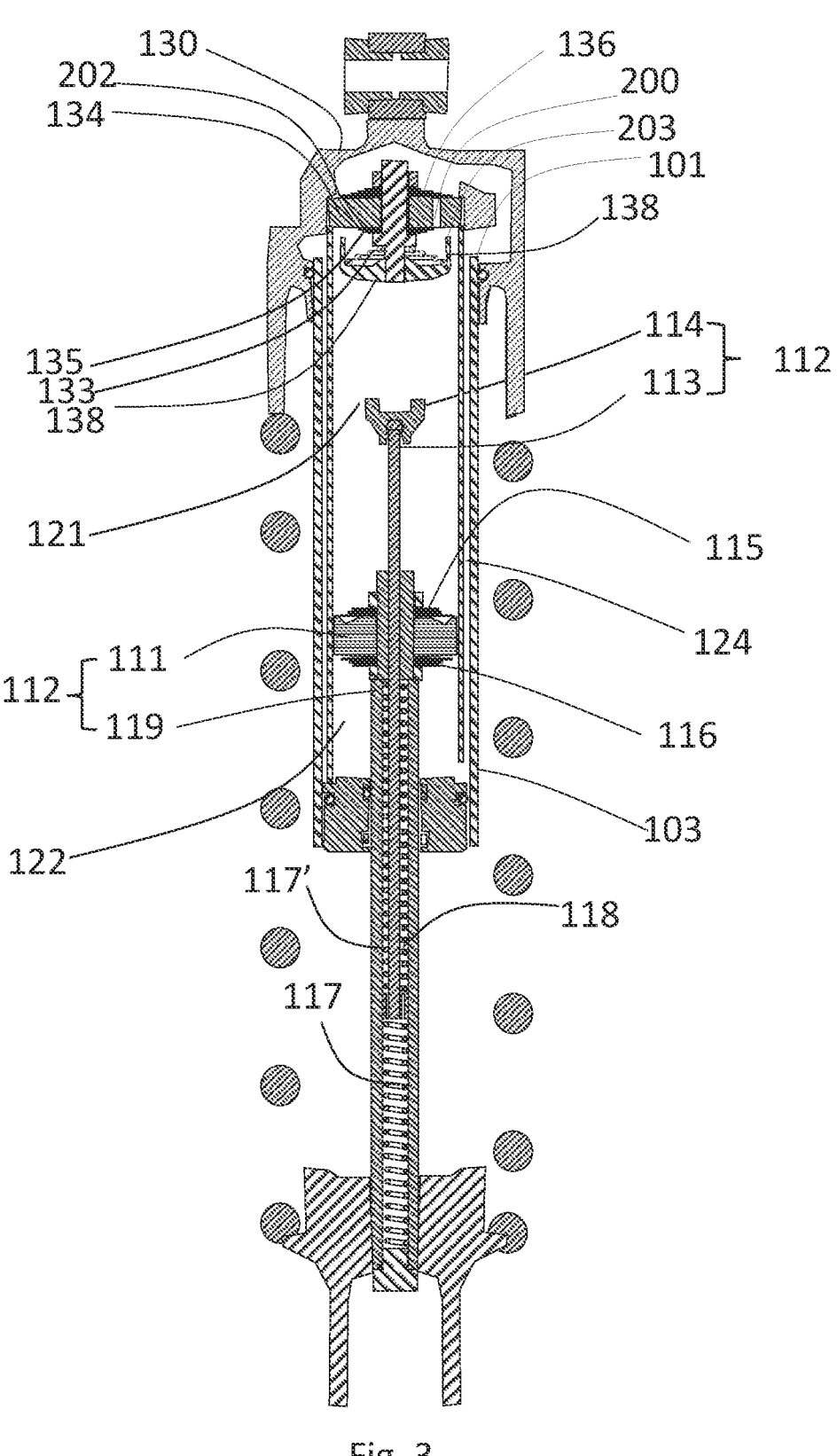
FIG. 3 shows a damper according to a third embodiment.

The third embodiment illustrated in FIG. 3 is more specific than the first embodiment. In FIG. 3, a spring 133 is interposed between a flow control member 138 of the actuated valve assembly 137 and the end member 134. The (conical) spring 133 urges the flow control member 138 away from said end member 134. In FIG. 3, the flow control member consists in a cup 138 that faces the inner surface of the end member 134 and forms with said end member 134 a circumferential control flow passage 203. The flow control member 138 is configured to reciprocate so as to allow the opening and closing of the control flow passage 203 fluidly connecting the first working chamber 121 to the outer chamber 124. Passages 200 provided in the end member 134 (and arranged downstream from the control flow passage 203) complement the circuit, ensuring a fluid connection between the working chamber 121 and the outer chamber 124. In FIG. 3, the end member 134 is provided with a first pressure regulation valve 136 for regulating flow between the first chamber 121 and the second chamber 122. The first pressure regulation valve 136 is preferably a one-way valve, in particular a shim valve as illustrated in FIG. 3. The first pressure regulation valve 136 has an upstream side in fluid communication with the first working chamber 121. The end member 134 comprises the passages in the form of through-passages 200 extending between the end member inner surface and an end member outer surface. In FIG. 3, the first pressure regulation valve 136, in particular a shim stack comprising one or more shims, is mounted on the end member outer surface.

A rebound check valve 135 is arranged in the end member 134 of the compression chamber 121, the rebound check valve 135 comprising one or more shims. Preferably, the shim(s) are mounted on the inner surface of the end member 134. Preferably, the shim(s) are positioned downstream from at least one additional passage 202 formed in the end member 134.

In FIG. 3, the stem assembly 112 comprises an actuating member 114, such as a puck, for actuating the actuated valve assembly 137, in particular the flow control member 138. The actuating member 114 is preferably mounted in rotation at a proximal end of a stem element 113, such as a rod. In particular, the actuating member 114 is mounted in rotation with at least two degrees of freedom, thereby ensuring a uniform pressure on the flow control member 138, when the actuating member 114 urges against the flow control member 138.

As illustrated in FIG. 3, the stem assembly 112 is resiliently connected to the piston rod 119 via two springs 117, 117'. A proximal 117' and distal 117 springs are disposed in a stack arrangement. A distal end of the stem element 113 is interposed between two springs 117, 117'. The proximal spring 117' reduces the pulling forces in case the actuating member 114 sticks to the control member 138 as there is more time for the force to build up. Furthermore, the proximal spring 117' ensures a softer engagement when the contacting member 114 hits the control member 138 as the stem assembly 112 starts to move with less effort.

When the damper of FIG. 3 is subjected to a compression damping cycle, the movable assembly 110 moves in a direction that reduces the volume of the compression working chamber 121. The movable assembly 110 drives the damping medium to flow from the compression working chamber 121 to the rebound working chamber 122 via one or more external loops (e.g. the outer chamber 124) and/or one or more passages in the movable assembly 110 (e.g. fourth regulation valve 116). The resulting flow resistance generates a pressure difference across the movable assembly 110 that opposes the movable assembly 110 motion.

When the contacting member 114 hits the control member 138 during a compression cycle, the contacting member 114 pushes the control member 138 upwards, as the preload of the distal spring 117 in the piston rod is higher than the preload of the conical coil spring 133 biasing the control member 138. As a result, the circumferential control flow passage 203 is closed and the first regulation valve 136 is being closed, forcing more flow through the fourth regulation valve 116 in the piston assembly 110. As a result the compression damping force increases.

When the damper of FIG. 3 is subjected to a rebound damping cycle, the movable assembly 110 moves in a direction that reduces the volume of the rebound working chamber 122. The movable assembly 110 drives the damping medium to flow from the rebound working chamber 122 to the compression working chamber 121 via one or more external loops (e.g. the outer chamber 124) and/or one or more passages in the movable assembly 110 (e.g. second regulation valve 115). The resulting flow resistance generates a pressure difference across the movable assembly 110 that opposes the movable assembly 110 motion.

When the rebound stroke has reached a position where the contacting member 114 no longer pushes upward the control member 138, the control member 138 starts to move away from the end member 134. The damping fluid can enter the volume inside the control member 138 through the rebound check valve 135.

No matter how early the PDS (progressive damping system) is activated, there is no reduction of the internal stroke. This is usually not the situation for other PDS systems. In addition, the manufacturing and assembling cost of the PDS components can be relatively low.

The movable assembly 110 of the damper of FIG. 3 comprises a second pressure regulation valve 115. The valve 115 has an upstream side in fluid communication with the rebound working chamber 122 and a downstream side in fluid communication with the compression working chamber 121. The second pressure regulation valve 115 is also named pressure regulation rebound valve.

Figure 4:
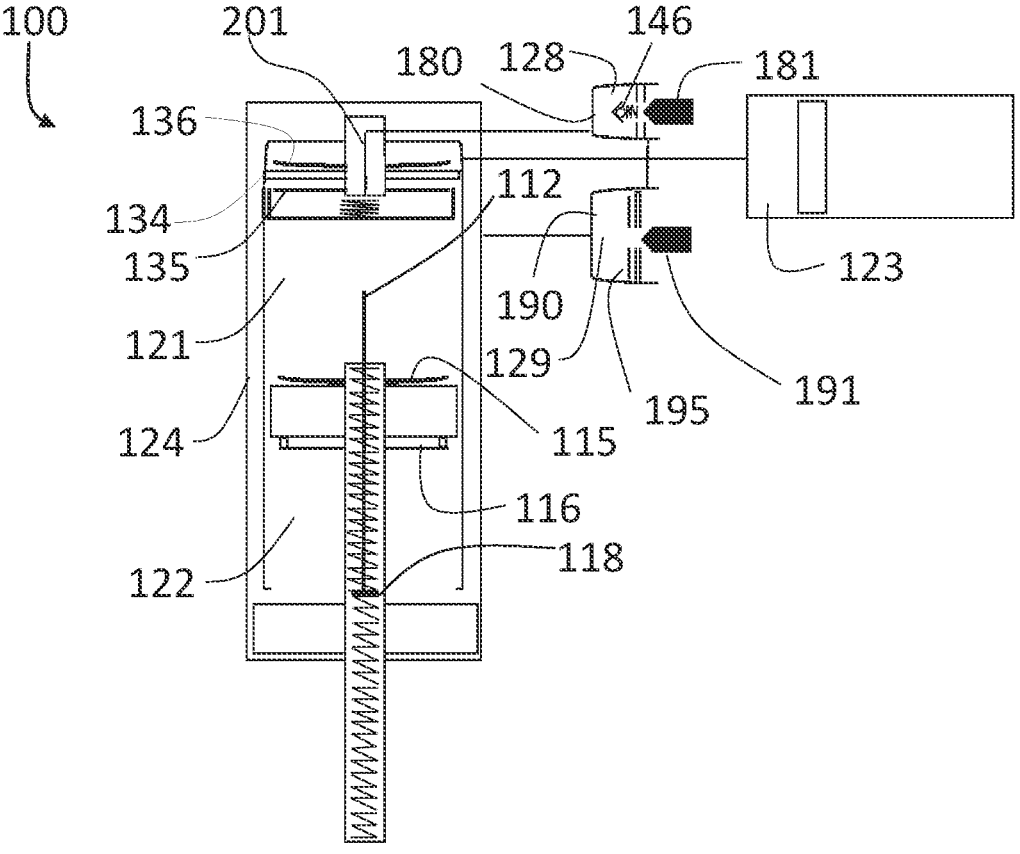
FIG. 4 represents a damper according to a fourth embodiment.

In FIG. 4 is represented a fourth embodiment. The fourth embodiment differs from the second embodiment illustrated in FIG. 2 in that two valve assemblies 180, 190, namely a first 180 and a second 190 valve assembly are disposed, respectively, in a first 128 and a second 129 valve assembly chamber. The two valve assemblies 180, 190 each comprise a bleed valve 181, 191, namely a first 181 and a second 191 bleed valve with an upstream side in fluid communication with the first working chamber 121 and the outer chamber 124, respectively.

The second 190 valve assembly further comprises a compression check valve 195. The compression check valve 195 has an upstream side in fluid communication with a downstream side of the compression bleed valve 181 and a downstream side in fluid communication with the outer chamber 124.

The rebound check valve 135 has an upstream side in fluid communication with a downstream side of the rebound bleed valve 191 and a downstream side in fluid communication with the compression working chamber 121.

The damper 100 in FIG. 4 compared to that of FIG. 2 further comprises a pressurization reservoir divided by a separating member, thereby defining a third chamber 123. The third chamber 123 is filled with the damping medium pressurized by a force acting on the separating member. The force acting on the separating member can be provided by means of a spring and/or a gas provided in the pressurization reservoir. When a gas is used, the gas preferably comprises an inert gas, such as argon, helium or nitrogen, or a combination of two or more thereof. The third chamber 123 is in fluid communication with the downstream side of the compression bleed valve 181 and the rebound bleed valve 191, and the upstream side of the compression check valve 195 and the rebound check valve 135. The third chamber 123 is also in fluid communication with the downstream side of the first (compression) pressure regulation valve 136.

Additionally to the first pressure regulation valve 136, a third pressure regulation valve 146 for the compression flow, can be provided as illustrated in FIG. 4.

When the damper of FIG. 4 is subjected to a compression damping cycle, the movable assembly 110 moves in a direction that reduces the volume of the compression working chamber 121. The movable assembly 110 drives the damping medium to flow from the compression working chamber 121 to the rebound working chamber 122 via one or more external loops and/or one or more passages in the movable assembly 110. The resulting flow resistance generates a pressure difference across the movable assembly 110 that opposes the movable assembly 110 motion.

When the compression damping cycle is performed, a first portion of the damping medium follows a flow path via optionally the third regulation valve 146, the compression bleed valve 181 and the compression check valve 195, and a second portion of the damping medium reaches the rebound working chamber 122 via the first pressure regulation valve 136, the compression check valve 195 and the outer chamber 124. Preferably, a third portion of the damping medium reaches the rebound working chamber 122 via the fourth pressure regulation valve 116 in the movable assembly 110.

Figure 5:
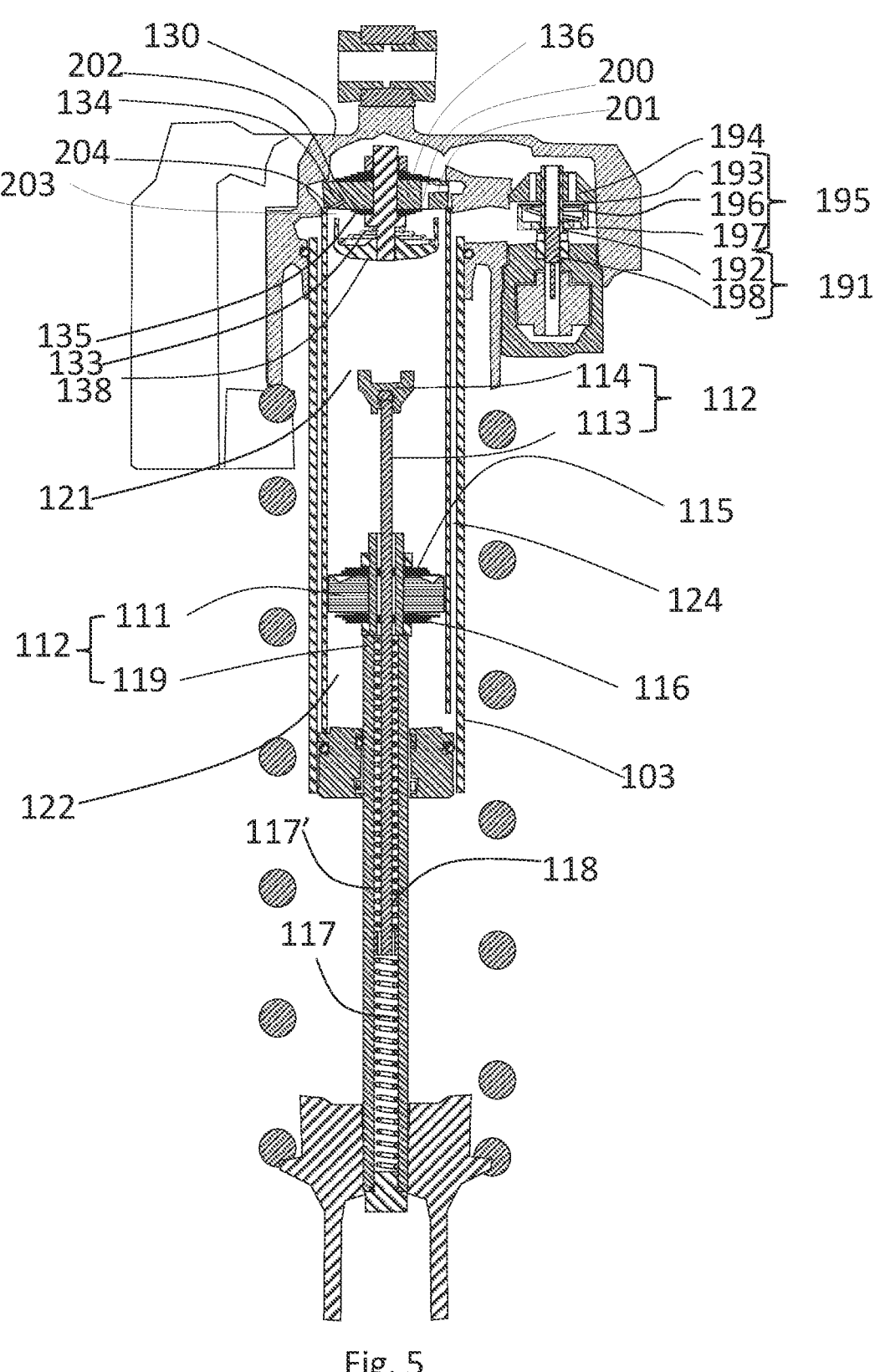
FIG. 5 illustrates a damper according to a fifth embodiment.

FIG. 5 shows a fifth embodiment for the damper 100 of the present disclosure. The fifth embodiment is more specific than the fourth embodiment and shows a more detailed representation of the damper 100.

In FIG. 5, the rebound valve assembly 190 of the fourth embodiment comprises a tube 192 having one or more openings and a needle 198. The needle 198 is advantageously slidably disposed inside the tube 192. Advantageously, the needle 198 controls the damping medium entering the tube 192 via the one or more openings, when in operation, i.e. when a rebound damping cycle is performed. Preferably, the needle 198 is actuated by a solenoid, a stepper motor (not shown) or biased by an adjustable spring (not shown).

The rebound valve assembly 190 further comprises the compression check valve 195. Advantageously, the compression check valve 195 comprises a shim 193 slidably disposed about the tube 192. The shim 193 is biased against a valve seat 194. An outside diameter of the valve seat 194 coincides with an inside diameter of the rebound valve assembly chamber 129. Advantageously, the valve seat 194 comprises openings facing the shim 193. Advantageously, the compression check valve 195 is biased by a helical spring 196. Preferably, an end of the helical spring 196 rests against the shim 193. Preferably, an opposite end of the helical spring 196 is arranged in a spring receiver 197. Preferably, the spring receiver 197 is disposed about the tube 192.

Alternatively to a shim 193 slidably disposed about the tube 192, a shim or a stack of shims can be fixed about the tube 192. The compression check valve 195 can comprise one or more shims fixed about the tube 192 of the rebound valve assembly 190 and preferably sandwiched between the valve seat 194 and a flange formed on the tube 192.

Similarly to the third embodiment, when the damper 100 is compressed and the contacting member 114 hits the control member 138, the contacting member 114 pushes the control member 138 upwards, as the preload of the distal spring 117 in the piston rod 119 is higher than the preload of the conical coil spring 133 biasing the control member 138. As a result, the circumferential control flow passage 203 is closed and the first regulation valve 136 is closing, forcing more flow through the fourth regulation valve 116. As a result, the compression damping force increases. As (further) passages 201 feeding the first bleed valve 181 are downstream from the control flow passage 203, the flows through these passages 201 reduce too. However, complementary passage(s) 204 opening in a region not covered by the control member 138 allow some fluid to enter the reservoir 123.

When the damper of FIG. 5 is subjected to a rebound damping cycle, the movable assembly 110 moves in a direction that reduces the volume of the rebound working chamber 122. The movable assembly 110 drives the damping medium to flow from the rebound working chamber 122 to the compression working chamber 121 via one or more external loops and/or one or more passages in the movable assembly 110. The resulting flow resistance generates a pressure difference across the movable assembly 110 that opposes the movable assembly 110 motion.

When the rebound damping is performed, a first portion of the damping medium follows a flow path via the rebound bleed valve 191 and the rebound check valve 135. A second portion of the damping medium reaches the compression working chamber 121 via the second pressure regulation valve 115 in the movable assembly.

When the rebound stroke has reached a position where the contacting member 114 no longer pushes upward the control member 138, the control member 138 starts to move away from the end member 134. The damping fluid can enter the volume inside the control member 138 through the rebound check valve 135.

The advantage of the embodiment of FIG. 5 of the present disclosure is that a large flow of damping medium can be handled during the compression and/or rebound cycle. The provision of at least one of the first pressure regulation valve 136 in the end member 134, the second pressure regulation (rebound) valve 115 and/or the fourth pressure regulation (compression) valve 116 in the movable assembly 110, instead of being arranged in the valve assembly chambers as it is the case in U.S. Pat. No. 9,091,319, not only frees some space in the valve assembly chambers 128, 129 that would be advantageously utilized, but also allows the selection of larger valve(s) fitting with the larger diameter of the movable assembly 110 and/or the end member 134, compared to the diameter of the valve assembly chambers 128, 129. This leads to an increased flow port surface area in the valve(s), in particular the at least one of the pressure regulation valve 136, the second pressure regulation (rebound) valve 115 and/or the fourth pressure regulation (compression) valve 116, thereby allowing a higher flow rate that can be handled by the valve(s). Increasing the size of the valve aperture(s) improves the hydraulic response time, and therefore the damper 100 response time.

As the effective area(s) of the above mentioned valve port(s) are larger than those of the compression and rebound valves disclosed in U.S. Pat. No. 9,091,319, the forces exerted on the spring of the valve are also greater. A spring with a higher spring rate is needed to guarantee a stroke compatible with the space available. Advantageously, thanks to a larger orifice size, the stroke of the movable element of the valves can be even reduced compared to the state of the art. Moreover, as the spring rate is higher, the mechanical natural frequency of the valves is increased, thereby preventing valve resonance.

Furthermore, as the valve assembly chambers 128, 129 are freed from the presence of the pressure regulation (compression) valve and the pressure regulation (rebound) valve in comparison to the design of U.S. Pat. No. 9,091,319 (in which, in each valve assembly chamber, a bleed, a regulation and check valves are arranged in a stack), more space is available in the valve assembly chambers 128, 129 for the bleed valves 181, 191 and the check valve(s) 135, 195, thereby enhancing their flow characteristics because of an increased available space, in particular in the longitudinal direction, namely the stroke direction. An increased stroke and the optimization of the space in the valve assembly chamber, as for instance shown in the embodiments of the disclosure, allow to handle an higher flow effective cross section and thereby higher flow rate, resulting in an improved dynamic response of the damper. Furthermore, springs with a higher spring rate can be provided in the valve assembly chambers 128, 129, thereby improving control and advantageously shifting the natural frequencies to higher range.

In FIG. 5, the pressure regulation compression valve 136 is mounted on an outer surface of the end member 134. The pressure regulation compression valve 136 has an upstream side in fluid communication with the compression working chamber 121 and a downstream side in fluid communication with the third chamber 123. Preferably, the pressure regulation compression valve 136 comprises one or more shims positioned downstream from the at least one through-passage 200. The shim valve is the preferred design for the pressure regulation compression valve 136. As an alternative to the shim valve, a spool or poppet valve can be foreseen.

In FIG. 5, the rebound check valve 135 has an upstream side in fluid communication with a downstream side of the rebound bleed valve 191 and a downstream side in fluid communication with the compression working chamber 121.

As shown in FIG. 5, the rebound check valve 135 comprises one or more shims. Preferably, the shim(s) are mounted on the inner surface of the end member 134. Preferably, the shim(s) are positioned downstream from at least one additional passage 202 formed in the end member 134. Advantageously, the at least one additional passage 202 is in fluid communication with the downstream side of the rebound bleed valve 191.

Figure 6:
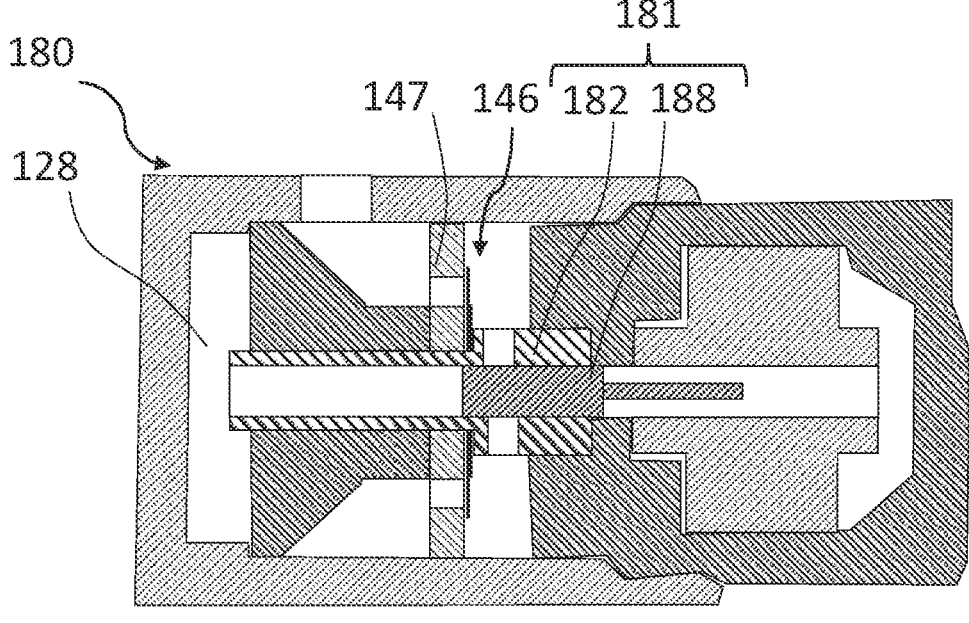
FIG. 6 shows a compression valve assembly according to the fifth embodiment.

FIG. 6 shows the compression valve assembly 180 according to the fifth embodiment. The damper 100 comprises the third pressure regulation valve 146 arranged in a compression valve chamber 128. Furthermore, an upstream side of the compression bleed valve 181 is in fluid communication with the compression working chamber 121 via the third pressure regulation valve 146. In an alternative (not shown) the third pressure regulation valve can be arranged downstream from the compression bleed valve 181.

Preferably, and as shown in FIG. 6, the third pressure regulation valve 146, namely a bypass pressure regulation valve for the compression flow, comprises one or a plurality of shims disposed about the tube 182.

In FIG. 6, the compression valve assembly 180 comprises a tube 182 having one or more openings and a needle 188. The needle 188 is advantageously slidably disposed inside the tube 182. Advantageously, the needle 188 controls the damping medium entering the tube 182 via the one or more openings, when in operation, i.e. when a compression damping cycle is performed. Preferably, the needle is actuated by a solenoid, a stepper motor (not shown) or biased by an adjustable spring (not shown). The compression bypass pressure regulation valve 146, in particular one or more shims, are positioned about the tube.

Figure 7:
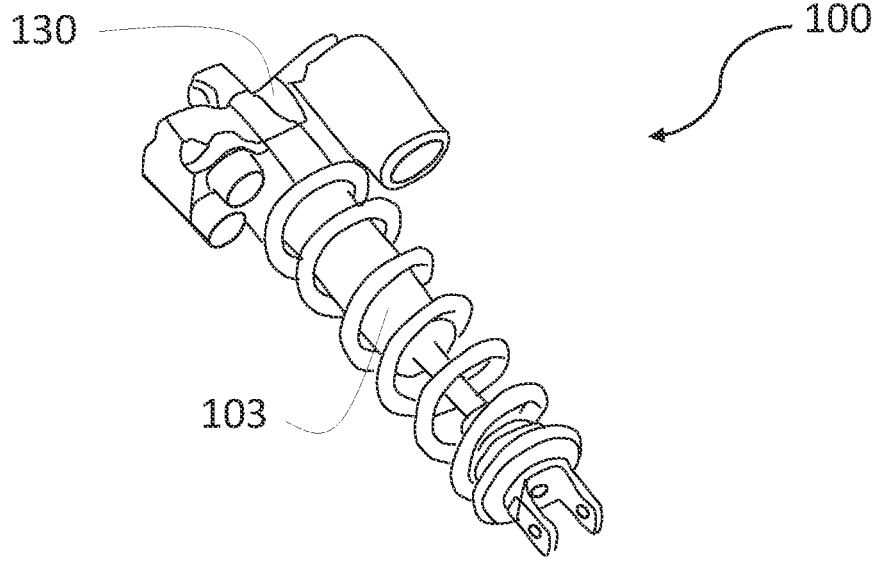
FIG. 7 shows a perspective view of a damper according to the disclosure.

FIG. 7 shows a damper 100 comprising a cylinder head 130 arranged at an end of the outer tube 103 according to the fourth or fifth embodiment of the disclosure. The cylinder head 130 is adjacent to the end of the inner tube and connected to the end member 134 (not shown). Advantageously, the compression valve assembly chamber (not shown), the valve assembly chambers 128, 129 (not shown) and the third chamber 123 (not shown) are formed in the cylinder head 130.

Further examples of the present disclosure or disclosure can be described with reference to following numbered clauses:

1. Damper (100) filled with a damping medium in use comprising:
   an inner tube (101);
   an end member (134) disposed at an end of the inner tube (101), the end member having an inner surface facing towards a first working chamber (121);
   a movable assembly (110) comprising a piston assembly (111) and a piston rod (119) attached to said piston assembly (111), said movable assembly (110) being slidably disposed within the inner tube (101), the movable assembly (110) defining the first working chamber (121) and a second working chamber (122) within the inner tube (101), the piston rod (119) disposed in the second working chamber (122), said movable assembly (110) having a surface facing towards the first working chamber (121);
   an actuated valve assembly (137) being provided in the end member (134), said valve assembly (137) being configured to control a damping medium flow entering or exiting the first working chamber (121);
characterized in that the movable assembly (110) comprises:
   a stem assembly (112) resiliently connected to the piston assembly (111) and/or the piston rod (119) via a biasing means (117, 117'), and
   an elongated cavity (118) opening in the surface facing towards the first working chamber (121) and extending in a direction opposed to the end member (134);
   in that the stem assembly (112) and the elongated cavity (118) are adapted so that the stem assembly (112) is guided in translation within the cavity (118);
   and in that the damper (100) is configured so that the stem assembly (112) actuates the actuated valve assembly (137), thereby causing a reduction in the damping medium flow exiting the first working chamber (121) via the actuated valve assembly (137), while the movable assembly (110) nears the end member (134).

2. Damper (100) according to clause 1, wherein the elongated cavity (118) is formed in the piston rod (119).

3. Damper (100) according to any of the previous clauses, wherein the actuated valve assembly (137) comprises a flow control member (138) slidingly mounted in said assembly (137), said actuated valve assembly (137) being configured to be actuated when a proximal end portion of the stem assembly (112) presses the flow control member (138).

4. Damper (100) according to any of the previous clauses, wherein the stem assembly (112) and the elongated cavity (118) are configured so that a portion of the stem assembly (112), in particular said portion extending from a proximal end of the stem assembly (112) or from a proximal end of the proximal end portion of the stem assembly (112) in the direction opposed to the end member (134), protrudes towards the end member (134) from the surface of the movable assembly (110) facing towards the first working chamber (121), when the stem assembly (112) does not press the flow control member (138) and/or when the proximal end of the stem assembly (112) or the proximal end portion of the stem assembly (112) does not contact the flow control member (138).

5. Damper (100) according to any of the previous clauses, wherein a spring (133) is interposed between the flow control member (138) and the end member (134), urging the flow control member (138) away from said end member (134).

6. Damper (100) according to any of the previous clauses, wherein the flow control member (138) is configured to reciprocate so as to allow the opening and closing of a control flow passage (203) that is fluidly connected to the first working chamber (121)

7. Damper (100) according to any of the previous clauses, wherein the flow control member (138) comprises or consists in a cup (138), the interior side of which faces the inner surface of the end member (134).

8. Damper (100) according to any of the previous clauses, wherein an outer tube (103) is arranged around the inner tube (101), the outer tube (103) defining an outer chamber (124) between the inner tube (101) and the outer tube (103), the outer chamber (124) being in fluid communication with the second working chamber (122).

9. Damper (100) according to the preceding clause in combination with clause 6, wherein the control flow passage (203) is fluidly connected to the outer chamber (124).

10. Damper (100) according to any of clauses 2, 4 to 9 in combination with Clause 3, wherein the stem assembly (112) comprises an actuating member (114) for actuating the actuated valve assembly (137), such as a puck, said member (114) forming the proximal end portion of the stem assembly (112), preferably said member (114) being fixed in rotation to a stem element (113) of said stem assembly (112), said stem element (113) axialy extending from the elongated cavity (118) to the actuating member (114).

11. Damper (100) according to the previous clause, wherein the actuating member (114) is connected to a proximal end of the stem element (113) by means of a spherical connection.

12. Damper (100) according to any of the previous clauses, wherein a distal portion of the stem element (113) is connected to the biasing means (117), said means (117) comprising at least one spring (117, 117').

13. Damper (100) according to the previous clause, wherein the at least one spring comprises a first spring (117, 117') that is connected at an end thereof to a distal end of the stem element (113) adapted to reciprocate within the piston rod (119) and at another end thereof to a distal or a proximal portion of the piston rod (119).

14. Damper (100) according to clause 12 or 13, wherein the at least one spring (117; 117') is arranged in the elongated cavity (118).

15. Damper (100) according to any of Clauses 12 to 14, wherein the at least one spring comprises a second spring (117', 117), wherein the first (117, 117') and second (117', 117) springs are in stack arrangement and the distal end of the stem element (113) is sandwiched between said springs (117, 117').

16. Damper (100) according to any of the previous clauses, further comprising:

two valve assemblies (180, 190), namely a first (180) and a second (190) valve assembly disposed, respectively, in a first (128) and a second (129) valve assembly chamber, the two valve assemblies (180, 190) each comprising a bleed valve (181, 191), namely a first (181) and a second (191) bleed valve with an upstream side in fluid communication with the first working chamber (121) and the outer chamber (124), respectively;

two check valves (195, 135), namely a first (195) and a second (135), the first check valve (195) being configured to allow flow from the first chamber (121) to the second chamber (122) via the first bleed valve (181), the second check valve (135) being configured to allow flow from the second chamber (122) to the first chamber (121) via the second bleed valve (122);

a pressurization reservoir divided by a separating member to define a third chamber (123) filled with the damping medium, in use, and pressurized by a force acting on the separating member, the third chamber (123) being in fluid communication with a downstream side of the first bleed valve (181) and a downstream side of the second bleed valve (191).

17. Damper (100) according to the previous clause, wherein the end member (134) is provided with a first pressure regulation valve (136) for regulating flow between the first chamber (121) and the second chamber (122), the first pressure regulation valve (136) having an upstream side in fluid communication with the first working chamber (121) via the actuated valve assembly (137).

18. Damper according to clause 16 or 17 wherein, the end member (134) comprises at least one through-passage (200) extending between the end member inner surface and an end member outer surface, the first pressure regulation valve (136) being mounted on the end member outer surface, preferably the at least one through-passage (200) being in flow communication with control flow passage (203).

19. Damper according to any of the previous clauses 16 to 18, wherein the first pressure regulation valve (136) comprises a one-way valve.

20. Damper according to any of the previous clauses 16 to 19, wherein the first pressure regulation valve (136) comprises one or more shims positioned downstream from the at least one through-passage (200).

21. Damper according to any of the previous clauses 16 to 20, wherein the first (195) and the second (135) check valve are in fluid communication with the first (181) and the second (191) bleed valve, respectively; an upstream side of the first (195) and the second check valve (135) are in fluid communication with the downstream side of the first (181) and the second (191) bleed valve, respectively; a downstream side of the first (195) and the second check valve (135) are in fluid communication with the outer chamber (124) and the first working chamber (121), respectively; and the third chamber (123) is in fluid communication with the upstream side of the first check valve (195) and the upstream side of the second check valve (135).

22. Damper according to the previous clause, wherein the end member (134) comprises at least one further passage (201) with an upstream end opening in the at least one through-passage (200) and a downstream end in fluid communication with the upstream side of the first bleed valve (181).

23. Damper according to any of the previous clauses 16 to 22, wherein each valve assembly (180, 190) comprises a tube (182, 192) having one or more openings and a needle (188, 198) slidably disposed inside the tube (182, 192) for controlling a damping medium flow entering inwardly through the one or more openings, in operation.

24. Damper according to the previous clause, wherein the needle (188, 198) is actuated by a solenoid, a stepper motor or biased by an adjustable spring.

25. Damper according to any of the previous clauses 16 to 24, wherein the second valve assembly (190) comprises the first check valve (195).

26. Damper according to the previous clause in combination with clause 23, wherein the first check valve (195) comprises at least one shim (193) disposed about the tube (192) of the second valve assembly (190) and being biased against a first valve seat (194), an outside diameter of the first valve seat (194) coinciding with an inside diameter of the second valve assembly chamber (129), the first valve seat (194) comprising openings facing the at least one shim (193) of the first check valve (195).

27. Damper according to the previous clause, wherein the at least one shim (193) of the first check valve (195), in particular one shim, is slidingly disposed about the tube (192) and biased by a first helical spring (196), an end of the first helical spring (196) resting against the at least one shim (193) of the first check valve (195) and an opposite end of the first helical spring (196) being arranged in a first spring receiver (197) disposed about the tube (192) of the second valve assembly (190).

28. Damper according to clause 26 or 27, wherein the one or more shims (193) of the first check valve (195) are sandwiched between the first valve seat (194) and a flange formed on the tube (192) of the second valve assembly (190).

29. Damper according to any of the previous clauses 16 to 28, wherein the end member (134) comprises the second check valve (135).

30. Damper according to the previous clause, wherein the second check (135) valve comprises one or more shims mounted on the end member inner surface and positioned downstream from at least one additional passage (202) formed in the end member (134), the at least one additional passage (202) being in fluid communication with the downstream side of the second bleed valve (191).

31. Damper according to any of clauses 17 to 30, wherein the first valve assembly (180) comprises a third pressure regulation valve (146) with an upstream side in fluid communication with the first chamber (121) and a downstream in fluid communication with the third chamber (123).

32. Damper according to the preceding clause in combination with clause 23, wherein the third pressure regulation valve (146) is arranged upstream of the first bleed valve (181), the third pressure regulation valve (146) comprising one or more shims disposed about the tube (182) of the first valve assembly (180), the one or more shims being sandwiched between a fourth valve seat (147) disposed about the tube (182) of the first valve assembly (180) and a flange formed on the tube (182) of the first valve assembly (180).

33. Damper (100) according to any of the previous clauses 1 to 15, wherein the end member (134) is provided with a first pressure regulation valve (136) for regulating flow between the first chamber (121) and the second chamber (122), the first pressure regulation valve (136) having an upstream side in fluid communication with the first working chamber (121) via the actuated valve assembly (137).

34. Damper according to the previous clause, wherein the end member (134) comprises at least one through-passage (200) extending between the end member inner surface and an end member outer surface, the first pressure regulation valve (136) being mounted on the end member outer surface, preferably the at least one through-passage (200) being in flow communication with the control flow passage (203).

35. Damper according to any of the previous clauses 33 to 34, wherein the first pressure regulation valve (136) comprises a one-way valve.

36. Damper according to any of the previous clauses 33 to 35, wherein the first pressure regulation valve (136) comprises one or more shims positioned downstream from the at least one through-passage (200).

37. Damper according to any of the previous clauses 33 to 36, comprising a rebound (135) check valve being configured to allow flow from the second chamber (122) to the first chamber (121) via the outer chamber (124).

38. Damper according to any of the previous clauses 33 to 37, wherein the end member (134) comprises the rebound check valve (135).

39. Damper according to any of the previous clauses 33 to 38, wherein the rebound check (135) valve comprises one or more shims mounted on the end member inner surface and positioned downstream from at least one additional passage (202) formed in the end member (134), the at least one additional passage (202) being in fluid communication with the downstream side of the outer chamber (124).

40. Damper according to any of the previous clauses, wherein the movable assembly (110) comprises a second pressure regulation valve (115) with an upstream side in fluid communication with the second working chamber (122) and a downstream side in fluid communication with the first working chamber (121).

41. Damper according to any of the previous clauses, comprising a cylinder head (130) arranged at an end of the outer tube (103), the cylinder head (130) being adjacent to the end of the inner tube (101) and connected to the end member (134), preferably the first valve assembly chamber (128), the second valve assembly chamber (129) and the third chamber (123) being formed in the cylinder head (130).

42. Damper according to any of the previous clauses, wherein the movable assembly (110) comprises a fourth pressure regulation valve (116) with an upstream side in fluid communication with the first chamber (121) and a downstream side in fluid communication with the second working chamber (122).

Although the present disclosure has been described and illustrated in detail, it is understood that the same is by way of illustration and example only and is not to be taken by way of limitation, the scope of the present disclosure being limited only by the terms of the appended clauses.

What is claimed is:

1. A damper filled with a damping medium in use comprising:
an inner tube;

an end member disposed at an end of the inner tube, the end member having an inner surface facing towards a first working chamber;
a movable assembly comprising a piston assembly and a piston rod attached to said piston assembly, said movable assembly being slidably disposed within the inner tube, the movable assembly defining the first working chamber and a second working chamber within the inner tube, the piston rod being disposed in the second working chamber, said movable assembly having a surface facing towards the first working chamber;
an actuated valve assembly being provided in the end member, said actuated valve assembly being configured to control a damping medium flow entering or exiting the first working chamber;
wherein the movable assembly comprises:
a stem assembly resiliently connected to the piston assembly and/or the piston rod via at least one biasing member, and
an elongated cavity opening in the surface facing towards the first working chamber and extending in a direction opposed to the end member,
wherein the stem assembly and the elongated cavity are adapted so that the stem assembly is guided in translation within the cavity,
wherein the damper is configured so that the stem assembly actuates the actuated valve assembly, thereby causing a reduction in the damping medium flow exiting the first working chamber via the actuated valve assembly, while the movable assembly nears the end member, and
wherein the actuated valve assembly comprises a flow control member slidingly mounted in said assembly, said actuated valve assembly being configured to be actuated when a proximal end portion of the stem assembly presses the flow control member.

2. The damper according to claim 1, wherein the elongated cavity is formed in the piston rod.

3. The damper according to claim 1, wherein the stem assembly and the elongated cavity are configured so that a portion of the stem assembly protrudes towards the end member from the surface of the movable assembly facing towards the first working chamber, when the stem assembly does not press the flow control member.

4. The damper according to claim 1, wherein a spring is interposed between the flow control member and the end member, urging the flow control member away from said end member.

5. The damper according to claim 1, wherein the flow control member is configured to reciprocate so as to allow the opening and closing of a control flow passage that is fluidly connected to the first working chamber.

6. The damper according to claim 1, wherein the flow control member comprises a cup having an interior side facing the inner surface of the end member.

7. The damper according to claim 1, wherein an outer tube is arranged around the inner tube, the outer tube defining an outer chamber between the inner tube and the outer tube, the outer chamber being in fluid communication with the second working chamber.

8. The damper according to claim 5, wherein an outer tube is arranged around the inner tube, the outer tube defining an outer chamber between the inner tube and the outer tube, the outer chamber being in fluid communication with the second working chamber, wherein the control flow passage is fluidly connected to the outer chamber.

9. The damper according to claim 1, wherein the stem assembly comprises an actuating member for actuating the actuated valve assembly, said member forming the proximal end portion of the stem assembly, said member being fixed in rotation to a stem element of said stem assembly, said stem element axially extending from the elongated cavity to the actuating member.

10. The damper according to claim 9, wherein the actuating member is connected to a proximal end of the stem element by a spherical connection.

11. The damper according to claim 9, wherein a distal end of the stem element is connected to the at least one biasing member, said at least one biasing member comprising at least one spring.

12. The damper according to claim 11, wherein the at least one spring comprises a first spring that is connected at an end thereof to the distal end of the stem element adapted to reciprocate within the piston rod and at another end thereof to a distal or a proximal portion of the piston rod.

13. The damper according to claim 11, wherein the at least one spring is arranged in the elongated cavity.

14. The damper according to claim 11, wherein the at least one spring comprises a first spring and a second spring, wherein the first and second springs are in stack arrangement and the distal end of the stem element is sandwiched between said first and second springs.

15. The damper according to claim 1, further comprising:
two additional valve assemblies, namely a first and a second valve assembly disposed, respectively, in a first and a second valve assembly chamber, the two valve assemblies each comprising a bleed valve, namely a first and a second bleed valve with an upstream side in fluid communication with the first working chamber and the outer chamber, respectively;
two check valves, namely a first and a second, the first check valve being configured to allow flow from the first working chamber to the second working chamber via the first bleed valve, the second check valve being configured to allow flow from the second chamber to the first chamber via the second bleed valve; and
a pressurization reservoir divided by a separating member to define a third chamber filled with the damping medium, in use, and pressurized by a force acting on the separating member, the third chamber being in fluid communication with a downstream side of the first bleed valve and a downstream side of the second bleed valve.

16. The damper according to claim 1, wherein the end member is provided with a first pressure regulation valve for regulating flow between the first working chamber and the second working chamber, the first pressure regulation valve having an upstream side in fluid communication with the first working chamber via the actuated valve assembly.

17. The damper according to claim 9, wherein the actuating member comprises a puck.

18. A damper filled with a damping medium in use comprising:
an inner tube;
an end member disposed at an end of the inner tube, the end member having an inner surface facing towards a first working chamber;
a movable assembly comprising a piston assembly and a piston rod attached to said piston assembly, said movable assembly being slidably disposed within the inner tube, the movable assembly defining the first working chamber and a second working chamber within the inner tube, the piston rod being disposed in the second working chamber, said movable assembly having a surface facing towards the first working chamber;

an actuated valve assembly being provided in the end member, the actuated valve assembly comprising a flow control member, said actuated valve assembly being configured to control a damping medium flow entering or exiting the first working chamber;
wherein the movable assembly comprises:
a stem assembly resiliently connected to the piston assembly and/or the piston rod via at least one biasing member, and
an elongated cavity opening in the surface facing towards the first working chamber and extending in a direction opposed to the end member,
wherein the stem assembly and the elongated cavity are adapted so that the stem assembly is guided in translation within the cavity,
wherein the damper is configured so that the stem assembly actuates the actuated valve assembly, thereby causing a reduction in the damping medium flow exiting the first working chamber via the actuated valve assembly, while the movable assembly nears the end member, and
wherein the flow control member comprises a cup having an interior side facing the inner surface of the end member.

19. A damper filled with a damping medium in use comprising:
an inner tube;
an end member disposed at an end of the inner tube, the end member having an inner surface facing towards a first working chamber;
a movable assembly comprising a piston assembly and a piston rod attached to said piston assembly, said movable assembly being slidably disposed within the inner tube, the movable assembly defining the first working chamber and a second working chamber within the inner tube, the piston rod being disposed in the second working chamber, said movable assembly having a surface facing towards the first working chamber;
an actuated valve assembly being provided in the end member, said actuated valve assembly being configured to control a damping medium flow entering or exiting the first working chamber;
wherein the movable assembly comprises:
a stem assembly resiliently connected to the piston assembly and/or the piston rod via at least one biasing member, and
an elongated cavity opening in the surface facing towards the first working chamber and extending in a direction opposed to the end member,
wherein the stem assembly and the elongated cavity are adapted so that the stem assembly is guided in translation within the cavity, and
wherein the damper is configured so that the stem assembly actuates the actuated valve assembly, thereby causing a reduction in the damping medium flow exiting the first working chamber via the actuated valve assembly, while the movable assembly nears the end member,
wherein the stem assembly comprises an actuating member for actuating the actuated valve assembly, said member forming the proximal end portion of the stem assembly, said member being fixed in rotation to a stem element of said stem assembly, said stem element axially extending from the elongated cavity to the actuating member,
wherein a distal end of the stem element is connected to the at least one biasing member, said at least one biasing member comprising at least one spring, and wherein the at least one spring comprises a first spring and a second spring, wherein the first and second springs are in stack arrangement, and the distal end of the stem element is sandwiched between the first and second springs.

20. The damper according to claim 19, wherein the actuating member comprises a puck.

\* \* \* \* \*